United States Patent [19]
DeHart

[11] Patent Number: 6,064,131
[45] Date of Patent: May 16, 2000

[54] PHASE INSULATION AND METHOD FOR INSERTION

[75] Inventor: Hobart DeHart, Austin, Ind.

[73] Assignee: Reliance Electric Industrial Company, Cleveland, Ohio

[21] Appl. No.: 09/131,300

[22] Filed: Aug. 10, 1998

[51] Int. Cl.[7] .................................................. H02K 1/00
[52] U.S. Cl. ............................................. 310/198; 29/606
[58] Field of Search .................................. 310/198, 179, 310/260; 29/596, 606, 732

[56] References Cited

U.S. PATENT DOCUMENTS

| | | | |
|---|---|---|---|
| 3,402,462 | 9/1968 | Walker et al. | 29/596 |
| 3,575,623 | 4/1971 | Stine | 310/260 |
| 3,579,791 | 5/1971 | Arnold et al. | 29/564 |
| 4,216,571 | 8/1980 | Miller et al. | 29/596 |
| 4,218,630 | 8/1980 | Watanabe | 310/260 |
| 4,276,689 | 7/1981 | Urick et al. | 29/596 |
| 4,335,325 | 6/1982 | Miller et al. | 310/214 |
| 4,349,956 | 9/1982 | Koenig | 29/596 |
| 4,389,584 | 6/1983 | Burns | 310/43 |
| 4,449,289 | 5/1984 | Kindig | 29/596 |
| 4,480,379 | 11/1984 | Witwer | 29/596 |
| 4,507,580 | 3/1985 | Obara | 310/214 |
| 5,331,240 | 7/1994 | Hyodo | 310/71 |
| 5,659,219 | 8/1997 | Momose et al. | 310/260 |

*Primary Examiner*—Nestor Ramirez
*Assistant Examiner*—Joseph Waks
*Attorney, Agent, or Firm*—Himanshu S. Amin; John M. Miller; John J. Horn

[57] ABSTRACT

Phase insulation for separating the end turns of the windings at the lead end of a stator core for a dynamoelectric machine and a method for the simultaneously inserting multiple sets of windings with the phase insulation into the stator core. The phase insulation is connected at its ends to form a continuous ring. The phase insulation includes openings along an edge combined with continuous portions between each opening and another edge. The openings and continuous portions allow the diameter of the phase insulation ring to contract while retaining substantially a ring shape without moving toward or away from the stator core and without tearing to maintain complete electrical separation of the different phase windings.

20 Claims, 5 Drawing Sheets

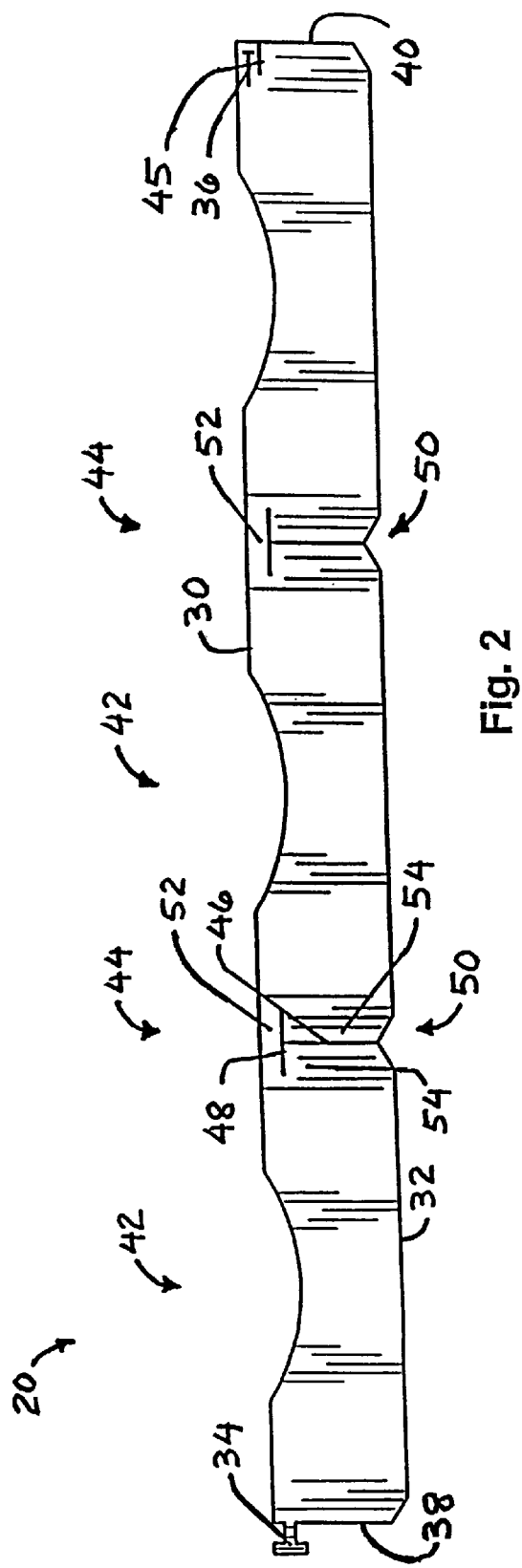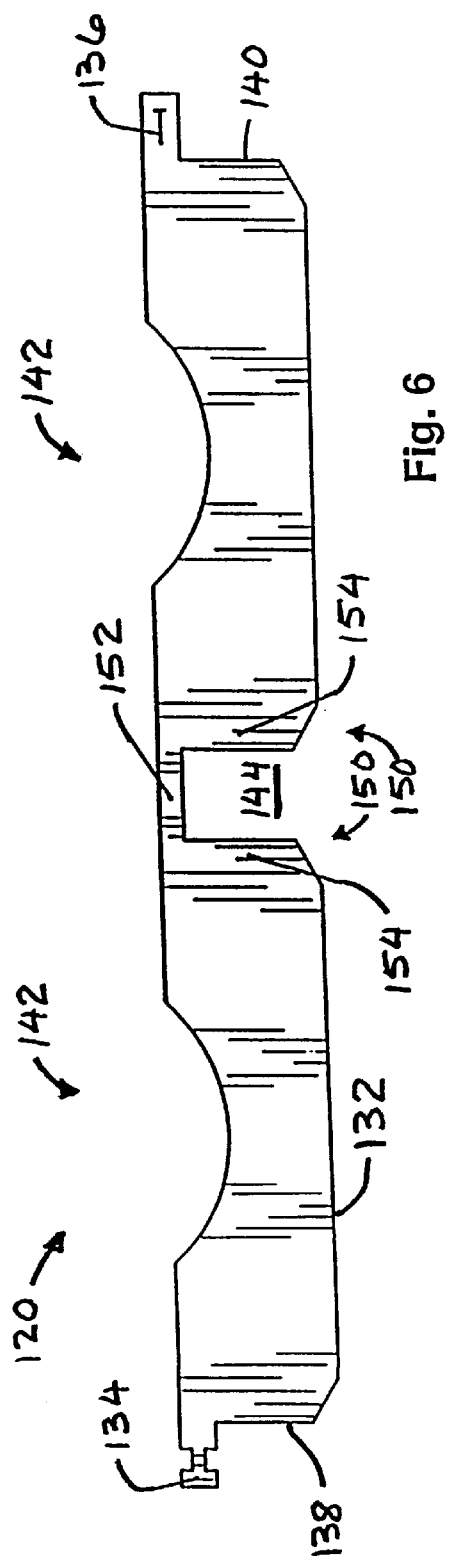

PHASE INSULATION AND METHOD FOR INSERTION

FIELD OF THE INVENTION

The invention described below generally relates to electrical insulation in a dynamoelectric machine, and more particularly, to insulation separating the phases of a multi-phase dynamoelectric machine and a method for inserting the insulation.

BACKGROUND OF THE INVENTION

Dynamoelectric machines, such as electric motors and generators, generally include hollow cylindrical stator cores which surround a rotatable rotor assembly. Electrical conductors are disposed in slots opening toward the hollow center of the stator core to react to or to generate electromagnetic fields. Generally, the conductors are coils of wire wrapped through the slots and around the ends of the slots in a winding pattern. In an electric motor, for example, energizing the coils generates an electromagnetic field in the core to rotate the rotatable rotor assembly in the hollow center. To generate the electromagnetic field and to prevent shorting, the core is electrically insulated from the coils of wire, and in a multi-phase machine, different phases of windings are insulated from one another at the end turn windings, the portion of the windings that extend from the ends of the slots in the stator core. Thus, end turn winding insulators, generally referred to as phase insulation, are generally used to insulate the different phases of windings from each other.

Phase insulation generally is formed of a rectangular piece of dielectric material formed into a ring. In a stator core having an inner set of windings and an outer set of windings, the windings are inserted into the slots of the stator core, and then the inner and the outer winding end turns are manually pried apart to insert the phase insulation therebetween. This is a very imprecise, slow and tedious process.

Various attempts have been made to automate the insertion process, but all have been unsatisfactory in several regards. One solution proposed inserting the outer set of windings, then inserting the phase insulation and then inserting the inner set of windings in three separate steps to effectively interpose the phase insulation between the inner and the outer sets of windings. This process, however, is still too slow and further improvements would be desirable. Furthermore, common problems with previous insertion techniques include tearing or misalignment of the phase insulation, which require manual adjustment and further inspection that offset any gains in efficiency from the automatic insertion process.

In addition, rectangular phase insulation which is formed into a cylinder cannot accommodate stator cores of different diameters. If the rectangular insulation is too short, there is a gap in the phase insulation. If the rectangular insulation is too long, the insulation tends to shift toward or away from the stator core as it folds. As a result, an excessive number of end windings are exposed and the chances for a short circuit greatly increase.

After the windings and insulation are put into a stator core, they are stitched or otherwise bound together to fix their relative positions. As the windings and insulation are stitched, the side of the insulation adjacent the stator core is pulled up against the underside of the windings. Occasionally some of the dielectric material extends under the windings and into the hollow center of the stator core where it can interfere with the rotation of the rotor.

SUMMARY OF THE INVENTION

The present invention provides a phase insulation for use on the lead end of a stator core of a dynamoelectric machine and a method for automatically inserting the phase insulation into the stator core. The phase insulation allows the simultaneous insertion of the phase insulation and the two winding coils, which turns what was previously a three-step operation into a single-step operation. In addition the phase insulation is convertible for use on different diameter stator cores.

The phase insulation is formed from a substantially rectangular strip of dielectric material with distal ends connected to form a ring. The phase insulation includes openings along one longitudinal edge of the strip and continuous portions along an opposing edge of the strip. The openings and continuous portions allow the diameter of the phase insulation ring to contract while retaining substantially a ring shape. In addition, this shape permits simultaneous insertion of the phase insulation and the multiple winding coils into the stator core of a dynamoelectric machine without the problems of the prior art.

According to one aspect of the invention, phase insulation for separating conductors conducting different phases at an end of a stator core of a multiphase dynamoelectric machine includes a strip of dielectric material connected To form cylinder. The cylinder has a top edge, a bottom edge and a side wall. The cylinder has a full diameter and at least one opening in the side wall that opens to the bottom edge and extends toward the top edge. The cylinder also has a corresponding continuous portion between each opening and the top edge. When the cylinder is compressed radially, the continuous portion folds and dielectric material forming sides of the opening moves across the opening to form a compressed cylinder having a compressed diameter which is less than the full diameter. The compressed cylinder electrically separates the windings conducting different phases.

According to another aspect of the invention, phase insulation for separating conductors at an end of a stator core of a dynamoelectric machine includes a strip of dielectric material having a ring shape with a top edge, a bottom edge and a side wall the ring having a full diameter, and means for maintaining a ring shape when the strip is radially compressed.

The method according to the invention is a method for simultaneously inserting phase insulation and separate phases of windings into a stator core of a dynamoelectric machine and includes placing an inner set of windings on an insert fixture, placing the phase insulation onto the insert fixture over the inner set of windings, placing an outer set of windings on the insert fixture over the phase insulation and radially offset from the inner set of windings, and simultaneously inserting the inner and outer sets of windings and the phase insulation into the stator core.

According to yet another aspect of the invention, phase insulation for separating different phases of winding end turns of a stator core of a multi-phase dynamoelectric machine includes a substantially rectangular strip of dielectric material having means for connecting ends of the strip to form a ring and means for permitting portions of the strip to fold as the diameter of the ring contracts without significant tearing of the dielectric material and without significantly shifting the position of the ring relative to the stator core.

According to another aspect of the invention, phase insulation for separating different phases of winding end turns of a stator core of a multi-phase dynamoelectric machine include a substantially rectangular strip of dielectric material having ends connected by a tab and a slot to form a continuous ring of dielectric material. The strip has a top edge and a bottom edge with at least one opening at the bottom edge extending toward the top edge, and a continuous portion between the opening and the top edge. Radially compressing the ring of dielectric material causes each continuous portion to fold and portions of the strip laterally adjacent the opening to overlap so that the different phases of winding end turns are electrically separated.

The foregoing and other features of the invention are hereinafter fully described and particularly pointed out in the claims, the following description and the annexed drawings setting forth in detail one or more illustrative embodiments of the invention, such being indicative, however, of but one or a few of the various ways in which the principles of the invention may be employed.

BRIEF DESCRIPTION OF THE DRAWINGS

FIG. 2 is a plan view of an embodiment of the phase insulation of FIG. 1;

FIG. 6 is a plan view of an additional embodiment of the phase insulation of FIG. 1.

DETAILED DESCRIPTION

A device and a method of the present invention are described below with reference to the drawings. The invention relates to phase insulation and a method for inserting the phase insulation into a stator core of a dynamoelectric machine. In particular, the invention relates to phase insulation which separates two sets of windings adjacent an end of the stator core of a multi-phase dynamoelectric machine and the simultaneous insertion of the phase insulation and the sets of windings into the stator core. The shape of the phase insulation is such that the phase insulation can contract radially without tearing or shifting.

Figure 1:
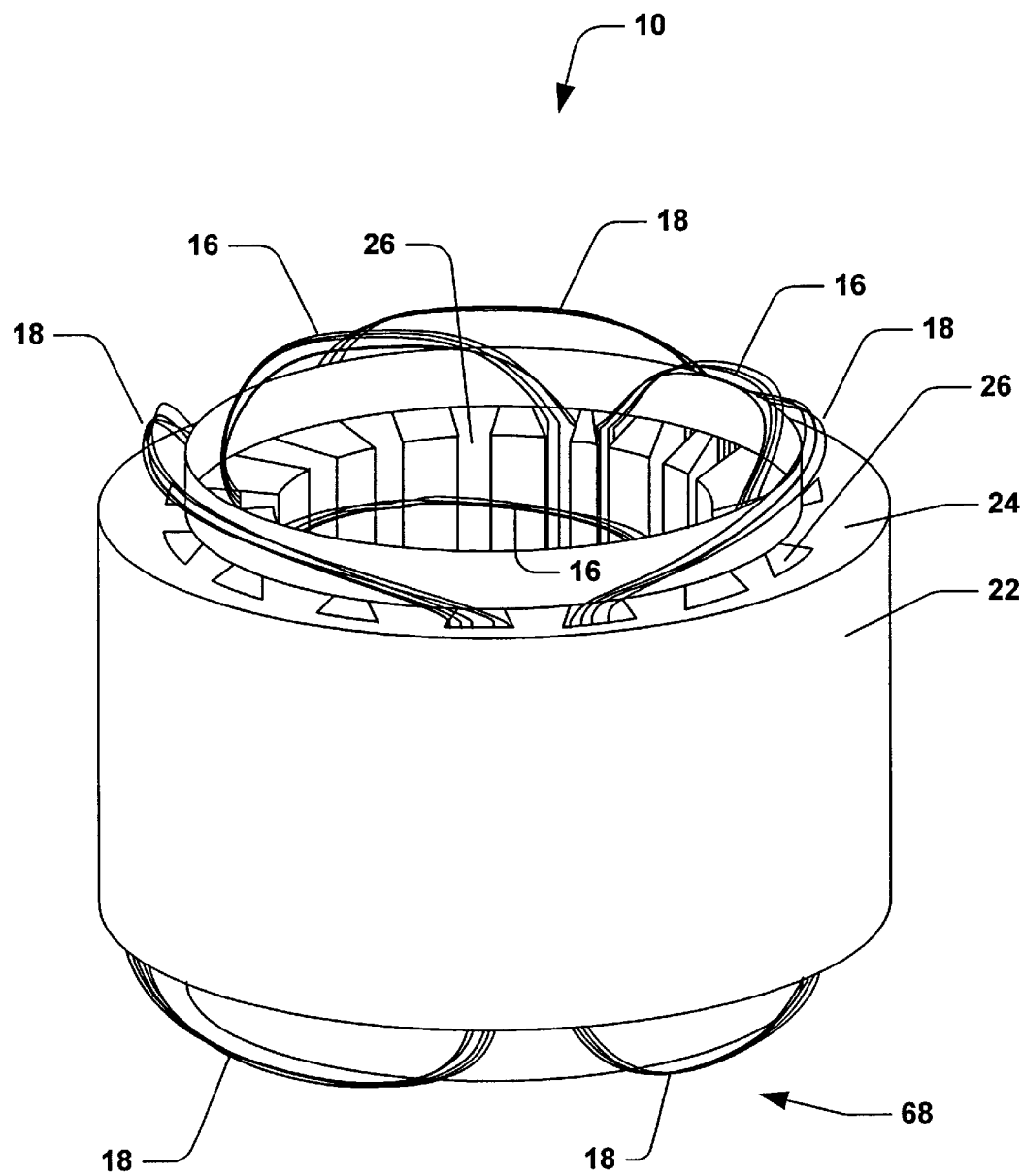
FIG. 1 is a schematic view of a stator core for an electric motor including winding coils and phase insulation in accordance with the present invention.

Referring initially to FIG. 1, a stator 10 for an electric motor (not shown) is illustrated with two sets of windings (a plurality of inner windings 16 and a plurality of outer windings 18) separated by phase insulation 20 in a stator core 22. The stator core 22 has a lead end 24 from which lead wires (not shown) of the windings 16, 18 are connected to a motor controller and a power source (not shown). The stator core 22 has a hollow, generally cylindrical shape with slots 26 formed therein and extending perpendicular to the lead end 24 opening inwardly. The slots 26 are filled with the conductive coils, or windings 16, 18, which generate magnetic fields required for operation of the electric motor.

Each winding 16, 18 is formed from a continuous wire wrapped or wound into a substantially circular bundle or coil. The inner windings 16 and the outer windings 18 alternatively are referred to as inner coils 16 and outer coils 18, respectively. The portion of each coil 16, 18 which protrudes from each end of the stator core 22 generally is referred to as the end turn. The end turns of the inner and outer windings 16, 18 are electrically separated from each other by the phase insulation 20.

Referring now to FIG. 2, an embodiment of the phase insulation 20 according to the invention is shown in plan view. The phase insulation 20 is fabricated in the required shape from a thin sheet of dielectric, or electrically insulating, material. The phase insulation 20 has a substantially rectangular shape forming a strip with a top edge 30, a bottom edge 32 and two relatively short side edges. The top edge 32 is placed adjacent the lead end 24 of the stator core 22 (FIG. 1). The two side edges are connected together to form a ring or a cylinder. In the illustrated embodiment the two side edges are connected by a tab 34 and a slot 36, thus the ends of the strip will be referred to as the tab end 38 and the slot end 40, respectively. The tab 34 and slot 36 are shaped such that the tab 34 may be operatively coupled with the slot 36 in a well known manner to form a continuous ring and to prevent gaps from forming in the insulating coverage of the phase insulation 20. Although the tab 34 and the slot 36 are an exemplary method of attaching the ends of the strip to form the ring, the ends may be connected by any suitable means to form the strip into a continuous, unbroken ring capable of electrically separating the inner windings 16 and the outer windings 18 (FIG. 1).

The top edge 30 of the phase insulation 20 has a plurality of arc shape notches 42. The arc shape notches 42 align with the coils of the inner windings 16 to keep dielectric material from protruding under the inner windings 16 into the hollow center of the stator core 22 as the windings 16, 18 and the phase insulation 20 are stitched together.

The phase insulation 20 also includes at least one opening and preferably a plurality of openings extending from the bottom edge 32 offset from and interposed between the arc shape notches 42 in the top edge 30. In the illustrated embodiment, the openings are formed by T-shape slits 44, each including a leg 46 and a crossbar 48. Each opening terminates at a notch 50 in the bottom edge 32 of the phase insulation 20. The notch 50 has a triangular shape with the base of the triangle open at the bottom edge 32 of the phase insulation 20. Alternatively, a partial circle or arc shape notch also would suffice. The tab end 38 and the slot end 40 of the phase insulation 20 also have triangular notches adjacent the bottom edge 32, with the bottom and one side of the triangle open and one side of the triangle formed by the phase insulation 20.

The leg 46 of the T-shape slit 44 is generally perpendicular to the bottom edge 32 and to the crossbar 48. The crossbar 48 is substantially parallel to the top edge 30 and the bottom edge 32 and partially defines a continuous portion 52 of the phase insulation 20 as the portion of the dielectric material between the crossbar 48 and the top edge 30. The continuous portion 52 connects sections of phase insulation adjacent the opening formed by the T-shape slit 44 to maintain the unbroken ring of dielectric material.

When the tab 34 and slot 36 are operatively coupled to form the ring, the tab end 38 and the slot end 40 of the phase insulation 20 cooperate to form an additional opening similar to the T-shape slits 44. In the opening which is under the tab 34 when it is coupled to the slot 36, an extension of the tab 34 from the tab end 38 and a small slit 45 in the slot end 40 perform the function of the crossbar 48, while the tab end 38 and the slot end 40 perform the function of the leg 46 of the T-shape slit 44. The coupled tab 34 and slot 36 perform in the same manner as the continuous portion 52. When the diameter of the ring 20 contracts radially the extended tab 34 folds so that the continuous ring shape is maintained.

Referring to FIGS. 1 and 2, following insertion of the phase insulation 20, the inner windings 16 and the outer windings 18, the windings 16, 18 and the phase insulation 20 are compressed radially to form a smaller diameter ring. The T-shape slits 44 allow portions of the phase insulation 20 adjacent the legs 46 of the T-shape slits 44 to move into an overlapping relationship. These portions will be referred to as overlapping portions 54 of the phase insulation. The notches 50 in the bottom edge 32 minimize or eliminate the tendency of edges of the overlapping portions 54 bounding the legs 46 of the T-shape slits 44 to catch as the diameter of the ring is reduced.

The leg 46 of each T-shape slit 44 preferably extends through most of the width of the strip of dielectric material so that the continuous portion 52 is relatively narrow. When the ring is compressed, the dielectric material forming the strip of phase insulation 20 must fold to minimize shifting. Since the continuous portion 52, between the crossbar 48 and the top edge 30, is relatively narrow, the continuous portion 52 folds before relatively wider sections of dielectric material between the T-shape slits 44. Because the continuous portion 52 is narrower than the phase insulation 20, less force is required to fold the continuous portion 52 than a fold across the entire width of the phase insulation 20. As a result, tearing of the phase insulation 20 around the fold is minimized or eliminated.

The T-shape slits 44 allow the overlapping portions 54 and the continuous portions 52 to move independently as the overlapping portions 54 on each side of the T-shape slit 46 slide over each other while the continuous portion 52 folds. Furthermore, because the continuous portion 52 is a relatively narrow portion of the strip, an imperfect fold that does not create a fold line perpendicular to the top edge 30 does not cause the ring to move significantly toward or away from the stator core 22. The openings formed by the T-shape slits 44 effectively compensate for imperfect folds. Thus, the T-shape slits 44 allow the phase insulation 20 to change diameter without significantly shifting the general position of the phase insulation 20 relative to the stator core 22. The phase insulation 20 remains substantially a ring, completely separates the windings 16, 18 from each other and prevents a short circuit between the different phases in the inner and outer windings 16, 18. Although the openings in the embodiment illustrated in FIG. 2 are formed by T-shape slits 44, other shapes of slits and openings that operate in substantially the same manner may be used in place of the illustrated T-shape slits 44.

Figure 3:
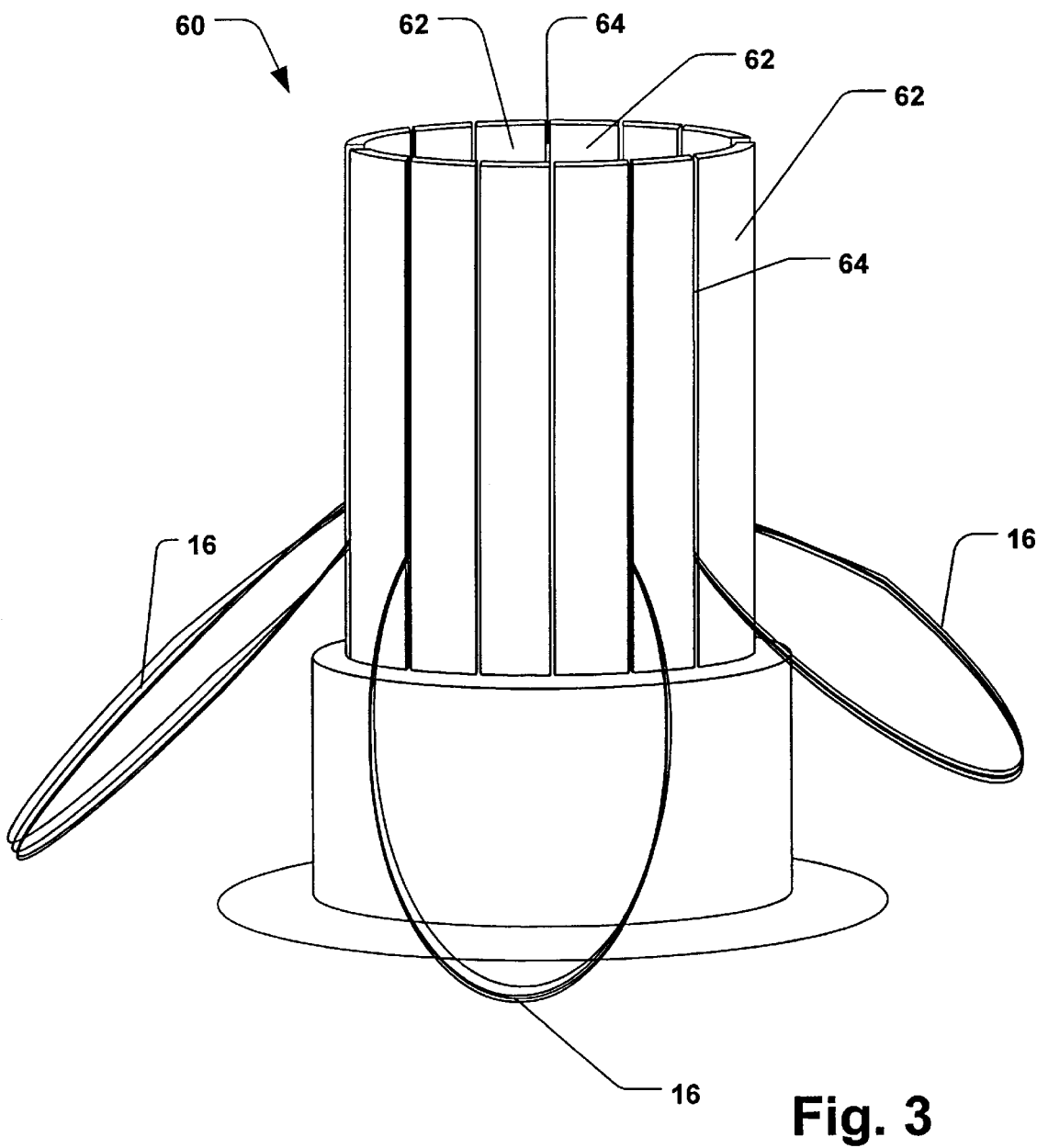
FIG. 3 is a schematic view of inner winding coils on an insert fixture for the mechanical insertion of the winding coils and phase insulation into the stator core of FIG. 1.
Figure 4:
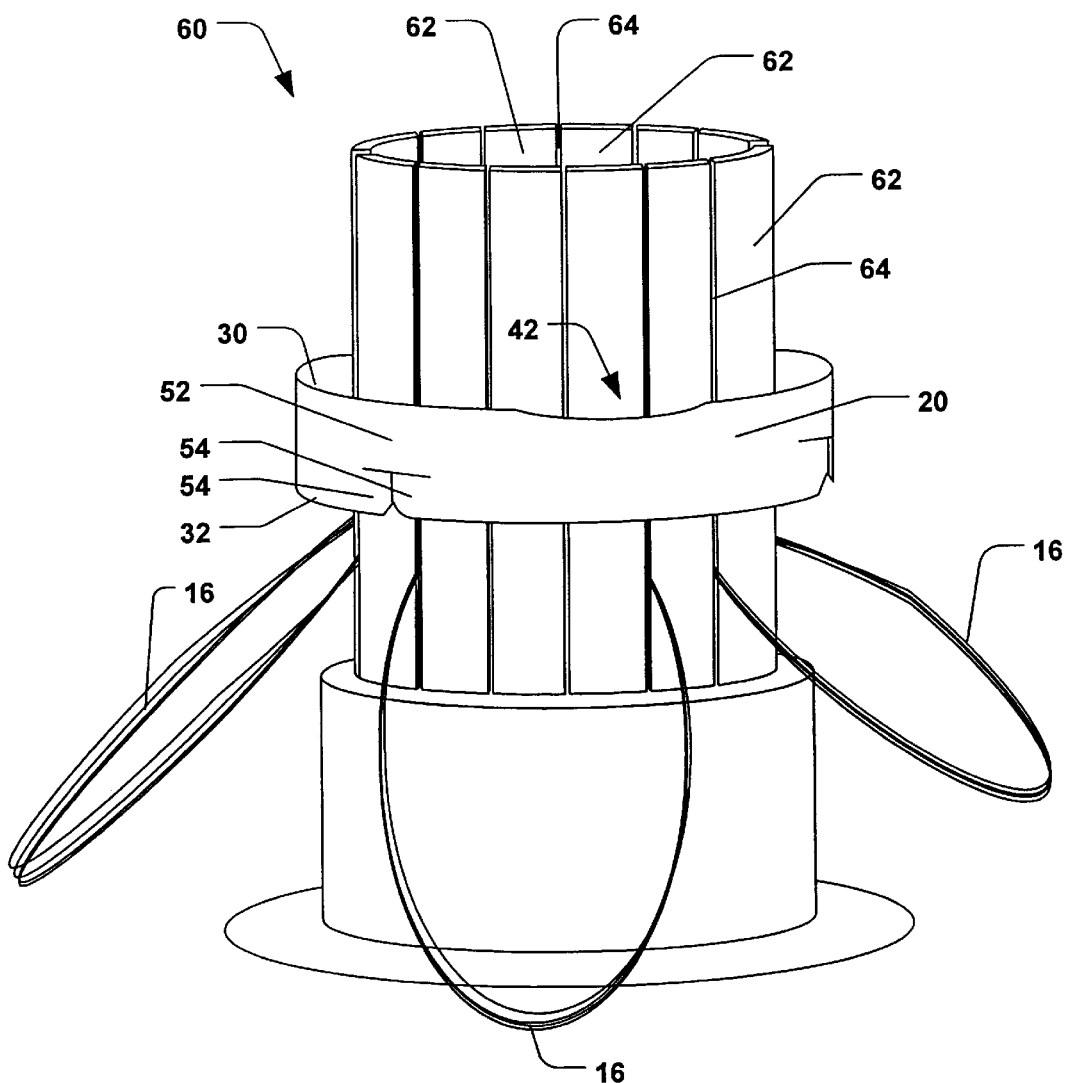
FIG. 4 is a schematic view of the inner winding coils and the insert fixture of FIG. 3 with the phase insulation of FIG. 2 placed over the inner winding coils.
Figure 5:
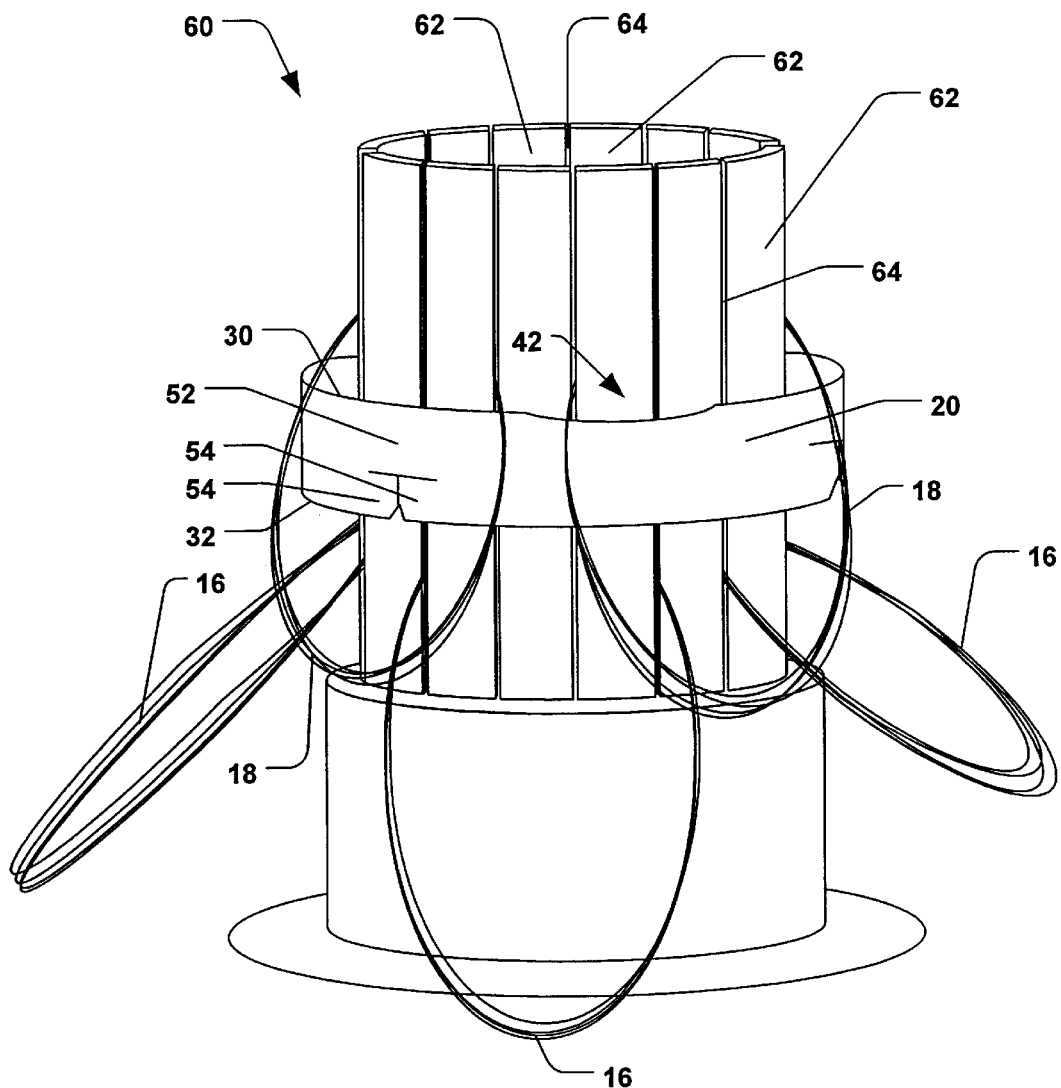
FIG. 5 is a schematic view of the inner winding coils, the insert fixture and the phase insulation of FIG. 4 with outer winding coils placed over the inner winding coils and the phase insulation.

Referring now to FIGS. 3 through 5, an insert tooling or fixture 60 is shown for illustrative purposes to describe the method of the invention. The fixture 60 includes a plurality of tines 62 forming a plurality of slots or gaps 64 and arranged in a circle to form a hollow cylinder. The method includes simultaneously inserting the windings 16, 18 and the phase insulation 20. Briefly, the method includes at least the steps of forming the windings 16, 18, placing the inner windings 16 into the proper gaps 64 in the insert fixture 60, placing the phase insulation 20 onto the insert fixture 60 over the inner windings 16, placing the outer windings 18 into the proper gaps 64 in the insert fixture 60 over the phase insulation 20 and the inner windings 16, simultaneously inserting the inner windings 16, outer windings 18 and phase insulation 20 into the stator core, attaching leads to the end of each wire in the windings 16,18 and stitching around the end turns 14 of the windings 16,18 and the phase insulation 20.

Preferably, the number of gaps 64 in the fixture 60 is equal to the number of slots 26 in the stator core 22 (FIG. 1). The inner windings 16 are placed into a predetermined number of gaps 64 in the insert fixture 60 with a predetermined number of open gaps extending between each side of each coil. For example, each of the inner coils 16 is placed in every third gap 64 of the insert fixture 60 and none of the coils share a gap 64. A portion of each coil is on the inside and a portion is on the outside hollow cylinder formed by the insert fixture 60.

The ends of the phase insulation 20 are connected to form a ring and the phase insulation 20 is placed over the tines 62 of the fixture 60 and over the inner windings 16. The phase insulation 20 does not have a required radial orientation relative to the gaps 64 and there is no arbitrary point on the phase insulation 20 which has to line up with a corresponding point on the fixture 60. However, the continuous portion 52 adjacent the top edge 32 of the phase insulation 20 preferably is oriented so that upon insertion the top edge 32 of the phase insulation 20 is adjacent the stator core 22 (FIG. 1), at the top in the illustrated embodiment. In addition, the phase insulation 20 must be radially oriented so that the arc shape notches 42 are aligned with the inner windings 16.

The outer windings 18 are shown placed over the inner windings 16 and over the phase insulation 20. Each outer coil 18 is placed in the gaps 64 of the fixture 60 in substantially the same manner as each of the inner coils 16. The outer windings 18 are placed in the gaps 64 not filled by the inner windings 16. In other words, the general position of the outer windings 18 is offset radially from the positions of the inner windings 16 already in the fixture 60.

Referring to FIGS. 1 and 3 through 5, the method of manufacturing a dynamoelectric machine by simultaneously inserting the phase insulation and the sets of windings 16, 18 into the stator core 22 will be described. First, each coil is formed in a manner which is well known in the art. For an exemplary winding machine for producing coiled windings, see U.S. Pat. No. 3,579,791 to Arnold.

Next, the inner windings 16 are transferred to the insert fixture 60 and are placed into the gaps 64 in the fixture 60 as is described above. The ends of the strip of phase insulation 20 are connected to form a ring and the phase insulation 20 is placed over the tines 62 of the fixture 60 and over the inner windings 16. The phase insulation 20 is radially positioned with the arc shape notches 42 aligned with the coils of the inner windings 16 and the top edge 30 and the bottom edge 32 are placed such that the top edge 30 will be adjacent to the lead end 24 of the stator core 22 following the insertion of the windings 16,18. The diameter of the fixture 60 and the inner windings 16 extending outwardly therefrom prevent the ring of phase insulation 20 from dropping past the inner windings 16.

The outer windings 18 then are placed in the gaps 64 in the fixture 60 over the phase insulation 20 and the inner windings 16. The outer windings 18 are dropped onto the insert fixture 60 radially offset from the inner windings 16 but otherwise in a substantially similar manner as is described above. The outer windings 18 and the inner windings 16 do not share gaps 64 in the fixture 60 or in the stator core slots 26. The offset inner windings 16 and the phase insulation 20 prevent the outer windings 18 from falling past the phase insulation 20 on the fixture 60.

The phase insulation 20, the inner windings 16 and the outer windings 18 are inserted simultaneously into the stator core 22 in a manner similar to the known method of inserting a single set of windings. A ram (not shown) inserted though the hollow center of the insert fixture 60 pushes the portion of the coils 16,18 which are within the hollow cylinder formed by the fixture 60 out of the gaps 64 in the insert fixture 60 and into the slots 26 of the stator core 22 and out the opposite, nonlead end of the stator core 22 to become the nonlead end end turns 68. The portion of the coils 16,18 on the outside of the fixture 60 is pulled off the fixture 60 and form the end turns 14 at the lead end of the stator core 22. The phase insulation 20 remains between the sets of windings 16,18 during the insertion operation and is pulled off the fixture 60 with the inner windings 16 and the outer windings 18 and remains between them to separate the end turns of the windings 16, 18 at the lead end 24 of the stator core 22.

The end turns, which include parts of both the inner and the outer windings 16,18, and the phase insulation 20 are molded and are compressed into shape, thereby shrinking the diameter of the ring of phase insulation 20. As the ring of phase insulation 20 contracts, the continuous portions 52 fold and the overlapping portions 54 move into an overlapping relationship, thereby maintaining a ring shape in the phase insulation 20 without shifting or tearing, and enhancing separation of the inner and the outer windings 16,18.

Leads (not shown) are attached to ends of the wires forming the inner and the outer windings 16,18 in a well known manner and the end turns of the windings 16,18 are stitched together with the phase insulation in between to ensure that the inner and outer windings 16,18 do not contact each other, the stator, a rotor or a housing of the motor. The arc shape notches 42, which are aligned with the coils of the inner windings 16, minimize or eliminate the possibility that dielectric material from the phase insulation 20 will be pulled up by the stitching operation and extend into the hollow center of the stator core 22 to interfere with the operation of the rotor (not shown).

Referring now to FIG. 6, a further embodiment of the phase insulation of the present invention is shown in plan view. This embodiment of the phase insulation functions substantially the same as the embodiment of FIG. 2.

The phase insulation 120 of FIG. 6 is formed of a thin sheet of dielectric material forming a strip with a top edge 130, a bottom edge 132 and two relatively short side edges. The ends of the strip are connected together with a tab 134 at a tab end 138 of the strip and a slot 136 at a slot end 140 of the strip. The top edge 130 has a plurality of arc shape notches 142 similar to the arc shape notches 42 in the embodiment illustrated in FIG. 2.

The phase insulation 120 also has at least one opening 144 extending from the bottom edge 132 across a substantial portion of the width of the strip and opening at the bottom edge 132. Each opening 144 has a rectangular shape and defines a corresponding continuous portion 152 between the opening 144 and the top edge 130 of the strip. The sides of the rectangular opening 144 adjacent the bottom edge have triangular shape notches 150 which minimize the opportunity for the sides of the rectangular opening 144 from catching as they come together. The dielectric material laterally adjacent the rectangular opening 144 comes together across the opening and potentially overlaps as the diameter of the phase insulation 120 contracts. Accordingly, these portions are referred to as overlapping portions 154 even though they may only come together and not overlap.

The opening 144 functions substantially the same as the T-shape slit 44 in the embodiment described above with reference to FIG. 2. As in the embodiment of FIG. 2, the continuous portion 152 folds when the diameter contracts while the rest of the ring of the phase insulation 120 is substantially unfolded and the sides of the rectangular opening 144, the overlapping portions 154, come together and potentially overlap. When the tab 138 and slot 140 are operatively coupled, they perform in the same manner as an additional continuous portion 152 with a rectangular opening between the tab 138 and the bottom edge 132. The tab 138 extends a substantial distance from the tab end 134 such that the tab end 134 and the slot end 136 perform in the same manner as the edges of the rectangular notch 144. Thus, the continuous portion formed by the tab 138 folds while the phase insulation 120 retains a ring shape without shifting or tearing during radial compression of the ring to a smaller diameter.

Although the invention has been shown and described with respect to a certain preferred embodiment or embodiments, equivalent alterations and modifications will occur to others skilled in the art upon reading and understanding this specification and the annexed drawings. In particular regard to the various functions performed by the above described integers (components, assemblies, devices, compositions, etc.), the terms (including a reference to a "means") used to describe such integers are intended to correspond, unless otherwise indicated, to any integer which performs the specified function of the described integer (i.e., that is functionally equivalent), even though not structurally equivalent to the disclosed structure which performs the function in the herein illustrated exemplary embodiment or embodiments of the invention. In addition, while a particular feature of the invention may have been described above with respect to only one of several illustrated embodiments, such feature may be combined with one or more other features of the other embodiments, as may be desired and advantageous for any given or particular application

What is claimed is:

1. Phase insulation for separating conductors conducting different phases at an end of a stator core of a multi-phase dynamoelectric machine, comprising:

a strip of dielectric material connected to form a cylinder with a top edge, a bottom edge and a side wall, the cylinder having a full diameter and at least one opening in the side wall extending through the bottom edge and extending toward the top edge, and a corresponding continuous portion between said at least one opening and the top edge, said continuous portion folding when the cylinder is compressed radially, said at least one opening defining a radial compression area;

wherein the cylinder is compressed radially, and the continuous portion folds, and the radial compression area compresses to form a compressed cylinder having a compressed diameter which is less than the fall diameter, the compressed cylinder electrically separating windings conducting said different phases.

2. The phase insulation of claim 1, wherein said strip of dielectric material is a substantially rectangular strip having a pair of sides and a pair of ends, where the ends are shorter than the sides, and the ends are connected to form said cylinder where the sides of the strip form the top edge and the bottom edge of the cylinder.

3. The phase insulation of claim 2, wherein the ends of the strip are connected by a tab at one of the ends that is inserted into a slot at the other end of the strip to form said cylinder of dielectric material.

4. The phase insulation of claim 3, wherein said at least one opening has a T-shape, where the T-shape includes a leg and a crossbar, the leg extending from the crossbar and through the bottom edge of the cylinder, the crossbar being substantially parallel to the bottom edge and substantially perpendicular to the leg.

5. The phase insulation of claim 4, wherein said bottom edge includes a notch adjacent said leg.

6. The phase insulation of claim 5, wherein the top edge of the strip is adjacent an end of the stator core.

7. The phase insulation of claim 6, wherein the top edge of the strip includes at least one arc shape notch said at least one arc shape notch extending downward towards said bottom edge.

8. The phase insulation of claim 3, wherein the opening has a substantially rectangular shape.

9. The phase insulation of claim 8, wherein the top edge of the strip includes at least one arc shape notch, said at least one arc shape notch extending downward towards said bottom edge.

10. The phase insulation of claim 8, wherein the strip includes an extension extending from an end of the strip, the extension including the tab, The extension forming said cylinder when the tab and the slot are operatively coupled.

11. A stator for a dynamoelectric machine, comprising:

a stator core having substantially parallel end faces, a plurality of sets of conductors, a ringed shape strip of a dielectric material having a full diameter, a top edge, a bottom edge and side wall, the top edge adjacent an end face of the stator core, at least one set of openings in the side wall, the openings extending through the bottom edge and extending toward the top edge, said openings defining a radial compression area, a continuous portion disposed between at least one of said openings and the top edge, and the openings allowing portions of the side wall adjacent the bottom edge to overlap and the continuous portion to fold to retain a ring shape having a reduced diameter which is less than the full diameter when the strip is radially compressed.

12. The stator of claim 11, wherein one end of the stator core is a lead end where leads from the conductors extend from a plurality of slots in the stator core.

13. The stator of claim 12, wherein the strip of said dielectric material has a substantially rectangular shape with a pair of sides and a pair of ends, the sides having a greater length than the ends, and the ends being connected to form the ring shape.

14. The stator of claim 13, wherein the ends of the strip are connected by a tab at one end of the substantially rectangular strip and a slot at another end of the strip, where the slot is adapted to receive the tab.

15. The stator of claim 14, wherein the openings define a T-shape, where the T-shape includes a leg and a crossbar, the leg of the opening terminating at the crossbar and extending through the bottom edge, the crossbar is substantially parallel to the bottom edge and substantially perpendicular to the leg.

16. The stator of claim 15, wherein the strip has a notch at the bottom edge, said notch being further positioned adjacent the leg of the opening.

17. A method for simultaneously inserting a phase insulation and separate phases of windings into a stator core of a dynamoelectric machine; comprising:

placing an inner set of windings on an insert fixture, connecting a strip of dielectric material to form the phase insulation having a top edge, a bottom edge and a side wall, the insulation having at least one opening in the side wall extending through the bottom edge and extending toward the top edge, and a corresponding continuous portion between said at least one opening and the top edge, said at least one opening defining a radial compression area, placing the phase insulation onto the insert fixture over the inner set of windings, placing an outer set of windings on the insert fixture over the phase insulation and radially offset from the inner set of windings, and simultaneously inserting the inner and outer sets of windings and the phase insulation into the stator core.

18. The method of claim 17, further comprising forming the windings and the phase insulation, including radially compressing the phase insulation to fold continuous portions between openings extending from a bottom edge of the phase insulation and a top edge of the phase insulation, the continuous portions having a relatively narrow width compared to the width of the phase insulation.

19. Phase insulation for separating different phases on winding end turns of a stator core of a multi-phase dynamoelectric machine, comprising:

A substantially rectangular strip of dielectric material having means for connecting ends of the strip to form a ring, said ring having a diameter and a position relative to the stator core, and an opening in the strip defining a radial compression area and a continuous portion adjacent thereto for permitting portions of the strip to fold as the diameter of the ring contracts without significant tearing of the strip and without significantly shifting the position.

20. Phase insulation for separating different phases of winding end turns of a stator core of a multi-phase dynamoelectric machine, comprising:

a substantially rectangular strip of dielectric material having ends connected by a tab and a slot to form a continuous ring of dielectric material, the strip having a top edge and a bottom edge with at least one opening at the bottom edge extending toward the top edge and a continuous portion between the opening and the top edge, wherein radially compressing the ring of dielectric material causes each continuous portion to fold and portions of the strip laterally adjacent the opening to overlap so that the different phases of winding end turns are electrically separated.

* * * * *